J. FRAME.
SCALE.
APPLICATION FILED OCT. 5, 1920.
1,425,466.
Patented Aug. 8, 1922.
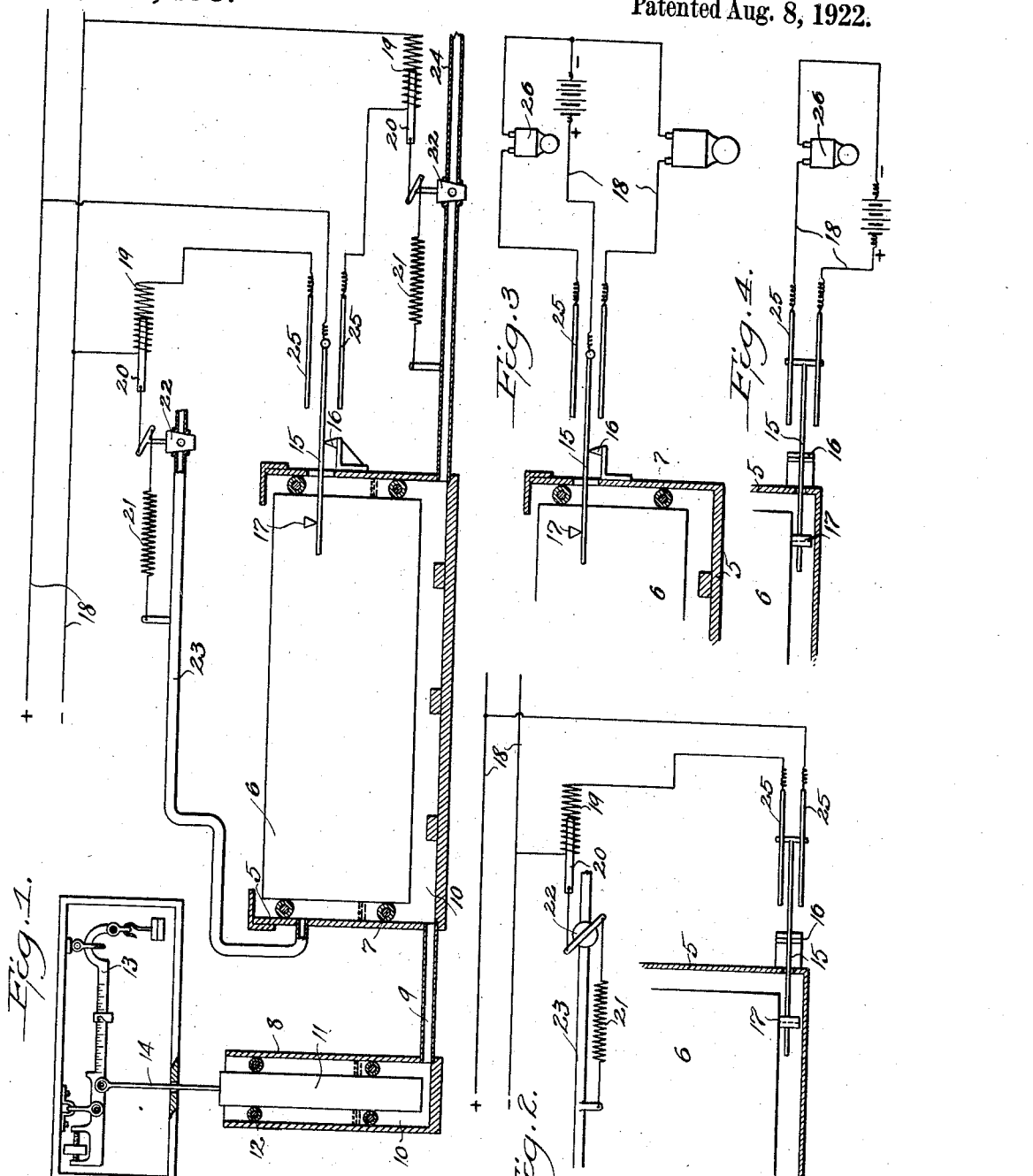

UNITED STATES PATENT OFFICE.

JOHN FRAME, OF SEARSPORT, MAINE.

SCALE.

1,425,466. Specification of Letters Patent. Patented Aug. 8, 1922.

Application filed October 5, 1920. Serial No. 414,783.

*To all whom it may concern:*

Be it known that I, JOHN FRAME, a citizen of the United States, and resident of Searsport, in the county of Waldo and State of Maine, have invented a new and Improved Scale, of which the following is a full, clear, and exact description.

My invention relates to a scale, and aims to provide a device of this nature which shall be operated with a minimum of mechanical movement.

By constructing a scale with this in view, errors incident to weighing are reduced to a minimum for the reason that the mechanical connections are reduced to a point at which possibility of error is a neglible quantity, although an accurate result may at all times be obtained.

Numerous objects of my invention will appear in the annexed specification and drawings, which latter present practical embodiments of my invention, and in which—

Figure 1 is a partly sectional diagrammatic view of the structure providing my invention.

Figure 2 is a sectional side view of the same.

Figure 3 is a sectional side view illustrating the parts diagrammatically, and showing a slightly modified form of scale, and Figure 4 is a plan view of the parts as illustrated in Figure 3.

In these views the reference numeral 5 indicates a tank, in which a floating platform 6 is positioned, suitable anti-friction members 7 being preferably interposed between these two elements with a view of permitting an easy movement of one with respect to the other.

A second tank 8, is positioned at any suitable distance from the tank 5, and any convenient form of connection 9 permitting a communication between the lower ends of these two tanks is provided.

In practicing with my invention, I aim to utilize fluid displacement, and with this in view, the tank 5 is filled to a certain depth with any suitable fluid 10, which fluid will flow through the pipe, or connection 9 into the tank 8, in which latter it will seek the level of its upper surface within the tank 5. The amount of fluid within the tank 5 is fixed, and when the same has reached its proper level, the float platform 6 will appear in the position indicated in Figure 1, the float 11 within the tank 8 resting within and above the body fluid 10 within the latter tank.

In this connection attention is invited to the fact that suitable anti-friction members 12 may also be conveniently used in this latter tank for permitting an ease of motion of the float 11 within the tank in a vertical plane, but preventing any lateral motion of the same.

It will now be appreciated that the parts in their normal position will present the appearance illustrated in Figure 1, in which the floats 11 and 6 are partially immersed and floating upon the surface of the fluid 10, the level of which is in the same horizontal plane in both tanks 5 and 8. Further, assuming that a weight is placed upon the float platform 6, it will be appreciated that the fluid 10 will be displaced from a point between the lower face of the float 6, to a position between the side faces of the tank and float.

This rise in the level of the fluid will be communicated to the fluid within the tank 8, which will cause the float 11 positioned therein to rise, consequently moving the scale 13, of any suitable type, upwardly by virtue of a connection 14 extending between these two elements, thus indicating that the scale beam 13 has insufficient weight associated with it to permit of the indicating of the total weight upon the float platform 6.

It is now to be noted, in the form illustrated in Figures 1 and 2, that the lever 15 is provided, which lever is rockingly associated with the tank 5 by means of the fulcrum 16, one end of the lever being movably secured, as at 17, to the float platform 6. Thus upon the platform 6 moving in a vertical plane the outer end of the lever will be rocked.

A source of current supply (not shown) connects with lead wires 18, one of which is connected with the lever 15, as has been clearly shown, the second lead wire is connected in parallel with a pair of solenoids 19, which solenoids serve to project armatures 20, normally held in spaced relationship with respect to said solenoids, by any suitable means, such as springs 21. These springs, aside from serving to retain the armatures 20 in extreme projected position, with respect to the solenoids 19, also serve to maintain valves 22 in closed position, which valves may further be opened upon the solenoids 19 attracting the armatures 20.

It is also to be noted that the valves 22 are interposed within pipes 23 and 24 respectively, the former serving as an inlet pipe, the latter as an outlet pipe. Now upon the object to be weighed being positioned upon the float platform 6, it will be seen that, as aforestated, the latter will be caused to sink to a certain depth within the fluid 10, thus displacing the latter and causing a consequential rise within the tank 8 proportionate to the amount of displacement, and rise of fluid within the tank 5. This will result in a rising of the float 11 indicated by the scale 13 moving to one of its extreme positions.

Synchronous with the depression of the float platform 6, the lever 15 will be oscillated, establishing contact with one of the circuits, causing an actuation of one of the solenoids 19, and consequently valve 22, to permit of the introduction of additional water through the inlet pipe 23 into the tank 5, to a point at which the float platform 6 will resume its normal plane, i. e. the position in which the lever 15 will not contact with either of the contact points 25. In this position it will be understood that the attraction exercised on the armatures 20 by the solenoids 19 will cease, permitting the valve 22 to close, and stopping the further inflow of fluid.

It will now be understood, due to the rise of fluid, that an additional pressure downwardly on the part of the float 11 has occurred, and an operator may now ascertain the weight of the object upon the platform 6 by applying a sufficient number of weights to the scale 13 to a point at which the same will indicate zero position, the aggregate weight being then read to determine the weight upon the float platform 6.

Upon the object being weighed, being removed from the platform, it will be understood that the same will rise, due to the excess amount of fluid within the tank 5. This again will result in the lever 15 being rocked, establishing contact with one of the points 25, causing an operation of the solenoids 19, and actuation of the armatures 20, to operate the valve 22 to permit the escape of fluid through the outlet pipe 24. This escape will be continued until the platform resumes its normal position, i. e. when the normal level of the fluid 10 has been reached.

Now referring more particularly to the construction illustrated in Figures 3, and 4, it will be seen that the structure provided in these figures is identical with the construction illustrated in Figures 1 and 2, with the exception that in lieu of the water inlet and outlet pipes 23 and 24 respectively, and their associated parts, and valve actuating mechanisms, accoustical alarms are provided.

In the construction illustrated in these latter figures, it will be seen that the lever 15 contacts, as in Figure 1, with the contact points 25, but contrary to the result achieved in the structure illustrated in Figures 1, and 2, a bell or other suitable sounding device 26 is interposed within the circuits, so that the operator of the scale may know when the platform 6 is not in its normal position, and may accordingly vary the amount of leverage upon the scale 13 to raise the platform to its normal position, at which point the alarm will cease sounding, subsequent to which a reading of the weights associated with the scale 13 may be had to ascertain the total weight upon the platform 6.

It will also be understood that the float 11 may be more in the nature of a weight rather than a buoyant medium. This may be true where it is desirable to have the float 11 in a condition at which it is partly suspended within the water, or in some instances, it may prove to advantage to have the float 11 incorporate negative buoyancy, the height of the column of water within the tank 8 serving to overcome the downward pull upon the bar 14 in this instance, which would promptly be indicated by the reading of the scale 13.

The advantage of bringing the float 6 to the same level after each weighing is that the apparatus in its entirety may be made considerably smaller and more compact than would be the case otherwise, that is to say, the tank in which the float is contained, may by my arrangement, be made comparatively smaller, as it needs only sufficient water to give buoyancy to the weight 6, under normal working conditions. By means of the various auxiliary devices shown, the tank may be quickly filled and emptied, and such being the case, if the float 6 is always brought to the same level after each weighing, no accommodation need be made for holding a very large body of water.

Thus I have provided a scale in which virtually no positive mechanical connection exists between the member providing the reading and the member receiving the weight. Further it will be appreciated that a scale constructed in accordance with my invention will not be susceptible to the strains and consequential distortions of the various parts, as is the case with present scales.

Obviously numerous modifications of structure might readily be resorted to without in the least departing from the spirit of my invention, which I claim as 1. A scale, including a pair of connected tanks, a platform within one of said tanks, a float within the second of the same, a scale associated with said float, said tanks being adapted to receive fluid for permitting a suspension of both said platform and float within their respective tanks, and mechanism connected with said platform and controllable thereby for permitting the introduction and escape of additional fluid within said tanks proportionate to the movement of the members within the same.

2. A scale, including a pair of connected tanks, a platform within one of said tanks, a float within the second of the same, a scale associated with said float, said tanks being adapted to receive fluid for permitting a suspension of both said platform and float within their respective tanks, and means controllable by said platform for the purpose of indicating when said platform is beyond its normal horizontal plane within the tank.

3. A scale, including a pair of connected tanks, a platform within one of said tanks, a float within the second of the same, a scale associated with said float, said tanks being adapted to receive fluid for permitting a suspension of both said platform and float within their respective tanks, a pivotally mounted lever, one of the ends of said lever being engaged by and moved by said platform upon a movement of the latter being effected, and means operated by said lever for automatically indicating any movement of said platform beyond its normal horizontal plane.

4. A scale, including a pair of connected tanks, a platform within one of said tanks, a float within the second of the same, a scale associated with said float, said tanks being adapted to receive fluid for permitting a suspension of both said platform and float within their respective tanks, a pivotally mounted lever, one of the ends of said lever being engaged by and moved by said platform upon a movement of the latter being effected, contact points adjacent the opposite end of said lever, a source of current supply, water inlet and outlet pipes communicating with one of said tanks, valves interposed within said pipes and being normally closed, armatures connected to said valves, solenoids co-operating with said armatures and interposed within a circuit, said circuit being connected to said contact points and lever whereby upon a movement of said lever being effected the circuit will be closed to effect an opening of one of said valves.

5. In a scale of the character described, the combination of a tank for holding a liquid, a float supported by said liquid, and adapted to support the weight of an article to be weighed, mechanism controllable by the depth of water in said tank for indicating the weight of said object to be weighed, and mechanism controllable by the position of said float for the purpose of controlling the amount of water contained in said tank.

JOHN FRAME.